United States Patent
Elliott et al.

(10) Patent No.: US 7,653,767 B2
(45) Date of Patent: Jan. 26, 2010

(54) HIERARCHICAL ENCLOSURE MANAGEMENT SERVICES

(75) Inventors: John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 11/626,084

(22) Filed: Jan. 23, 2007

(65) Prior Publication Data

US 2008/0177902 A1 Jul. 24, 2008

(51) Int. Cl.
*G06F 13/12* (2006.01)
(52) U.S. Cl. .................. 710/62; 710/8; 711/112; 711/167; 711/114
(58) Field of Classification Search .......... 710/8, 710/62
See application file for complete search history.

(56) References Cited

U.S. PATENT DOCUMENTS

| 6,219,727 | B1 * | 4/2001 | Kailash et al. ............ 710/48 |
| 6,292,878 | B1 * | 9/2001 | Morioka et al. ........... 711/209 |
| 6,654,831 | B1 * | 11/2003 | Otterness et al. .......... 710/74 |
| 6,754,768 | B2 | 6/2004 | Dimitri et al. |
| 6,772,108 | B1 * | 8/2004 | Stolowitz ................. 703/27 |
| 6,850,410 | B2 * | 2/2005 | Peeke et al. ........... 361/679.32 |
| 7,035,955 | B2 * | 4/2006 | Bobbitt et al. ............ 710/305 |
| 7,146,492 | B2 * | 12/2006 | Bolt ....................... 713/1 |
| 7,305,520 | B2 * | 12/2007 | Voigt et al. .............. 711/112 |
| 7,506,085 | B2 * | 3/2009 | Bunker et al. ............ 710/60 |
| 2002/0046276 | A1 * | 4/2002 | Coffey et al. ............ 709/224 |
| 2003/0188059 | A1 | 10/2003 | Zack |
| 2004/0064638 | A1 * | 4/2004 | Chong, Jr. ................ 711/114 |
| 2004/0128456 | A1 * | 7/2004 | Kobayashi et al. ........ 711/162 |
| 2004/0148460 | A1 | 7/2004 | Steinmetz et al. |
| 2004/0153685 | A1 | 8/2004 | Tuttle et al. |
| 2004/0162921 | A1 | 8/2004 | Teow et al. |
| 2004/0177218 | A1 * | 9/2004 | Meehan et al. ............ 711/114 |
| 2004/0193791 | A1 * | 9/2004 | Felton et al. ............. 711/112 |
| 2005/0172073 | A1 * | 8/2005 | Voigt et al. .............. 711/114 |
| 2006/0095595 | A1 * | 5/2006 | Dalton et al. ............. 710/5 |
| 2006/0112249 | A1 * | 5/2006 | Bomhoff et al. .......... 711/167 |
| 2006/0176889 | A1 | 8/2006 | Berman |
| 2007/0061638 | A1 * | 3/2007 | Nishiuchi et al. .......... 714/718 |
| 2007/0073939 | A1 * | 3/2007 | Matsushige et al. ........ 710/62 |
| 2007/0266218 | A1 * | 11/2007 | Achiwa .................. 711/170 |
| 2008/0126696 | A1 * | 5/2008 | Holland et al. ........... 711/114 |

* cited by examiner

*Primary Examiner*—Niketa Patel
*Assistant Examiner*—Ernest Unelus
(74) *Attorney, Agent, or Firm*—Griffiths & Seaton PLLC

(57) ABSTRACT

A configuration of an array of storage devices compliant with a fiber-channel arbitrated loop (FC-AL) specification includes first and second controllers having integrated first and second SCSI enclosure services (SES) processing devices acting as leader processors. Third and fourth controllers are coupled to the first and second controllers and act as subordinate processors. The third and fourth controllers have integrated third and fourth SCSI enclosure services (SES) processing devices. Each of the SES processing devices synchronizes and merges data to create a single control image for the entire configuration, presenting a single SES instance to a storage device interconnect network and to host controller software.

18 Claims, 6 Drawing Sheets

RECEIVE DIAGNOSTIC RESULTS - Enclosure Status Page

| Bytes | Description |
|---|---|
| 0 | Page Code = 02h |
| 1 | Status Summary |
| 2-3 | Page Length = 00DCh |
| 4-7 | Generation Code = 00000000h |
| 8-11 | <u>Device Overall Status</u> |
| 12-15 | Device Element Status #1 |
| 16-19 | Device Element Status #2 |
| 20-23 | Device Element Status #3 |
| 24-27 | Device Element Status #4 |
| 28-31 | Device Element Status #5 |
| 32-35 | Device Element Status #6 |
| 36-39 | Device Element Status #7 |
| 40-43 | Device Element Status #8 |
| 44-47 | Device Element Status #9 |
| 48-51 | Device Element Status #10 |
| 52-55 | Device Element Status #11 |
| 56-59 | Device Element Status #12 |
| 60-63 | Device Element Status #13 |
| 64-67 | Device Element Status #14 |
| 68-71 | Device Element Status #15 |
| 72-75 | Device Element Status #16 |

*FIG. 4*

RECEIVE DIAGNOSTIC RESULTS - Enclosure Status Page

| Bytes | Description |
|---|---|
| 0 | Page Code = 02h |
| 1 | Status Summary |
| 2-3 | Page Length = 00DCh |
| 4-7 | Generation Code = 00000000h |
| 8-11 | <u>Device Overall Status</u> |
| 12-15 | Device Element Status #1 |
| 16-19 | Device Element Status #2 |
| 20-23 | Device Element Status #3 |
| 24-27 | Device Element Status #4 |
| 28-31 | Device Element Status #5 |
| 32-35 | Device Element Status #6 |
| 36-39 | Device Element Status #7 |
| 40-43 | Device Element Status #8 |
| 44-47 | Device Element Status #9 |
| 48-51 | Device Element Status #10 |
| 52-55 | Device Element Status #11 |
| 56-59 | Device Element Status #12 |
| 60-63 | Device Element Status #13 |
| 64-67 | Device Element Status #14 |
| 68-71 | Device Element Status #15 |
| 72-75 | Device Element Status #16 |
| 76-79 | Device Element Status #17 |
| 80-83 | Device Element Status #18 |
| 84-87 | Device Element Status #19 |
| 88-91 | Device Element Status #20 |
| 92-95 | Device Element Status #21 |
| 96-99 | Device Element Status #22 |
| 100-103 | Device Element Status #23 |
| 104-107 | Device Element Status #24 |
| 108-111 | Device Element Status #25 |

FIG. 5

| 112-115 | Device Element Status #26 |
|---------|---------------------------|
| 116-119 | Device Element Status #27 |
| 120-123 | Device Element Status #28 |
| 124-127 | Device Element Status #29 |
| 128-131 | Device Element Status #30 |
| 132-135 | Device Element Status #31 |
| 136-139 | Device Element Status #32 |

FIG. 5
*(Cont'd)*

HIERARCHICAL ENCLOSURE MANAGEMENT SERVICES

BACKGROUND OF THE INVENTION

1. Field of the Invention

The present invention relates in general to computers, and, more particularly, to an apparatus and method of hierarchical enclosure management services.

2. Description of the Prior Art

Data storage systems are used to store information provided by one or more host computer systems. Such data storage systems receive requests to write information to a plurality of data storage devices and requests to retrieve information from that plurality of data storage devices. It is known in the art to configure the plurality of data storage devices into two or more storage arrays.

Storage Enclosures, e.g., disk enclosures in a "Just-A-Bunch-Of-Disks" topology (JBODs), "Switched-Bunch-Of-Disks" topology (SBODs), and the like have traditionally been implemented with a single set of physical resources. The devices are generally treated as a single instance of an enclosure with all shared resources controlled by a common single enclosure services process/instance. Most vendor components to manage storage enclosures have been developed with consideration to the number of hard disk drive (HDD) devices that will be within a single enclosure package and most original equipment manufacturer (OEM) storage enclosure implementations have a legacy of products that conform to this convention.

To improve the storage density [number of HDDs packaged per Electronics Industry Association (EIA)-sized unit in a single storage enclosure], high density packaging techniques can be used to increase the number of HDDs within a given volume of space. In addition, each individual instance of a storage enclosure is typically interconnected via a disk fabric interconnect technology [e.g., Fibre Channel Arbitrated Loop (FC-AL), Serial Attached SCSI (SAS), SCSI, SATA, SSA] at some cost of interconnect componentry [cables, small form factor pluggable transceiver modules, gigabit interface controllers (GBICs)].

Additionally, many storage controller systems provide multiple disk controller instances to allow users to partition their storage devices into separate domains for reasons of reliability, availability, and serviceability. Once the number of HDDs moves beyond the number that traditional enclosures and enclosure management components are designed for, new components and new storage enclosure configurations must be designed to meet the demand for increased HDD density. As such, new development of enclosure management services software and HDD communication fabric management code is required to be developed at significant design, development, and verification expense.

SUMMARY OF THE INVENTION

Thus, what is needed is an apparatus and method to allow product line to make independent decisions regarding whether it is more important to constrain cost (eliminate interconnect componentry cost), configure for greatest reliability (distribute storage devices/enclosures on independent storage controller interfaces), or optimize the number storage devices per signaling domain while conserving as much of the storage enclosure management services software and HDD communications management code as possible. When considering the design it is also incumbent on the designers to consider the architectural limitations of the storage device communications interconnect network.

In one embodiment, the present invention is an array of storage devices compliant with a fibre-channel arbitrated loop (FC-AL) specification, comprising first and second controllers having integrated first and second SCSI enclosure services (SES) processing devices acting as leader processors, and third and fourth controllers coupled to the first and second controllers and acting as subordinate processors, the third and fourth controllers having integrated third and fourth SCSI enclosure services (SES) processing devices, wherein each of the SES processing devices synchronizes and merges data to create a single control image for the entire configuration, presenting a single SES instance to a storage device interconnect network and to host controller software.

In another embodiment, the present invention is a system for managing data within a fibre channel arbitrated loop (FC-AL) dual loop storage network, comprising first and second controller cards having first and second SCSI enclosure services (SES) processor modules organized as leader processors, and third and fourth controller cards having third and fourth SCSI enclosure services (SES) processor modules organized as subordinate processors the third and fourth controller cards electrically connected to the first and second controller cards, wherein the first SES processor and the third SES processor are presented within the storage network as a single logical entity on the first of the dual loops, and the second SES processor and the fourth SES processor are presented within the storage network as a single logical entity on the second of the dual loops.

In another embodiment, the present invention is a method of manufacturing an array of storage devices compliant with a fibre-channel arbitrated loop (FC-AL) specification, comprising providing first and second controllers having integrated first and second SCSI enclosure services (SES) processing devices acting as leader processors; and providing third and fourth controllers coupled to the first and second controllers and acting as subordinate processors, the third and fourth controllers having integrated third and fourth SCSI enclosure services (SES) processing devices, wherein each of the SES processing devices synchronizes and merges data to create a single control image for the entire configuration, presenting a single SES instance to a storage device interconnect network and to host controller software.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 4 and 5 depict example enclosure status pages reflecting single virtual enclosures maintaining status pages for individual virtual enclosure resources (FIG. 4) and status pages reflecting all of the resources of the enclosure (FIG. 5).

DETAILED DESCRIPTION OF THE DRAWINGS

Figures 1A, 1B, 1C:
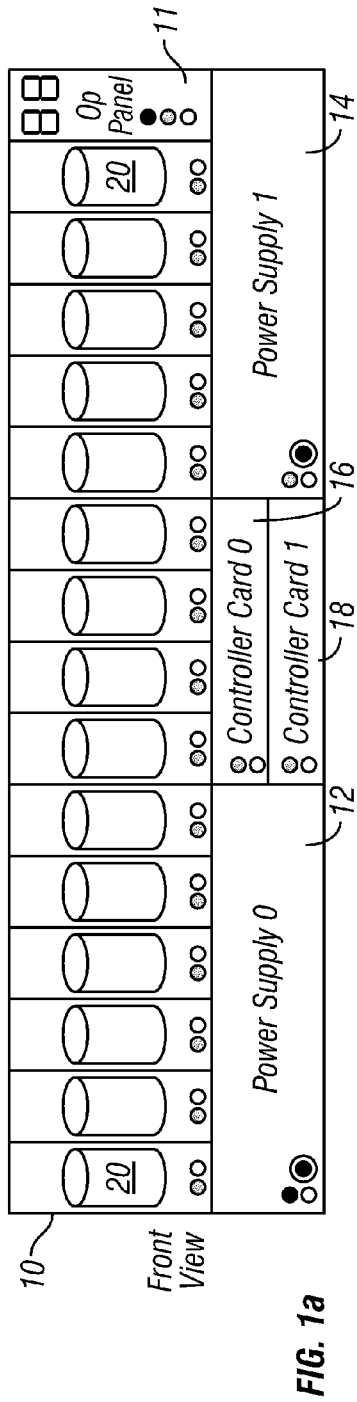
FIG. 1 illustrates a single high density switched-bunch-of-disks (SBOD) enclosure which can be logically partitioned into two virtual SBOD enclosures or be managed as a single monolithic SBOD enclosure entity.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In a RAID storage system, the storage device network fabric consists of devices that require support processor modules to manage and maintain the operational state of the network. In the case of modular storage systems, the support processors may also be used to manage a modular enclosure's enclosure management services. The enclosure management services support processor can include a SCSI Enclosure Services processor module (SES) or (SESP) that is capable of being an initiator device within the storage device communications network. The present invention manages the number enclosure management services processors that are presented as FC-AL loop target devices to the FC-AL communications fabric network minimizing the enclosure services management device addressing overhead seen by the fabric while optimizing the number of storage devices that are presented to the fabric and addressable by the FC-AL initiators.

In this configuration, a logical representation of a set of enclosure management services processors is presented as a single FC-AL target device instance to the storage device fabric while enabling full management of enclosure and FC-AL loop resources on each FC-AL loop of a dual loop pair. Managing the physical and logical resources in this manner preserves the existing system management and RAID controller software that interacts with the enclosure management services and HDD communications fabric management software.

The present invention is directed to an apparatus configured such that four (4) enclosure management services processor modules [e.g., SCSI Enclosure Services (SES) processors] are presented as two logical entities, one on each FC-AL dual loop, thus conserving the number of FC-AL addresses that are consumed by each enclosure for management services. The conserved addresses can in turn be utilized for addressing storage devices on the fabric.

FIGS. 1a, 1b and 1c illustrate a single high density SBOD enclosure module 10 in front, rear, and right side views, respectively. Enclosure 10 can be logically partitioned into two independent virtual SBOD enclosures 10 or be managed as a single monolithic SBOD enclosure entity. Enclosure 10 as depicted includes such subcomponentry as Operator display panels 11, 13, power supplies 12, 14, SBOD controller cards 16, 18, 26, and 28, and blower devices 22, 24. An array of HDDs 20 is distributed throughout the enclosure 10 as shown which are separated by plenum 30, backplanes 40 and 42, and midplanes 32 and 33. Finally, a feedthru cards 36 are shown.

In the virtual enclosure contexts, each virtual enclosure module can be configured as an independent FC-AL enclosure that may be placed on independent FC-AL dual loops via external connections [using separate optics, cables, interconnect infrastructure] or the two virtual enclosures may be configured such that both virtual enclosures are present on a single FC-AL dual loop as a single mechanical instance. In the second configuration [single enclosure instance] inter-enclosure connectivity can be leveraged to interconnect the two virtual enclosures internally as a cascaded, trunked string of two enclosures within the enclosure packaging, forming an interdependent configuration. The third configuration option is to manage all of the resources of the physical enclosure as a single physical and logical entity. The implementation of this third configuration option and the management of the optimization of the FC-AL communications architecture addressing limitations is the focus of the present invention.

Figure 2:
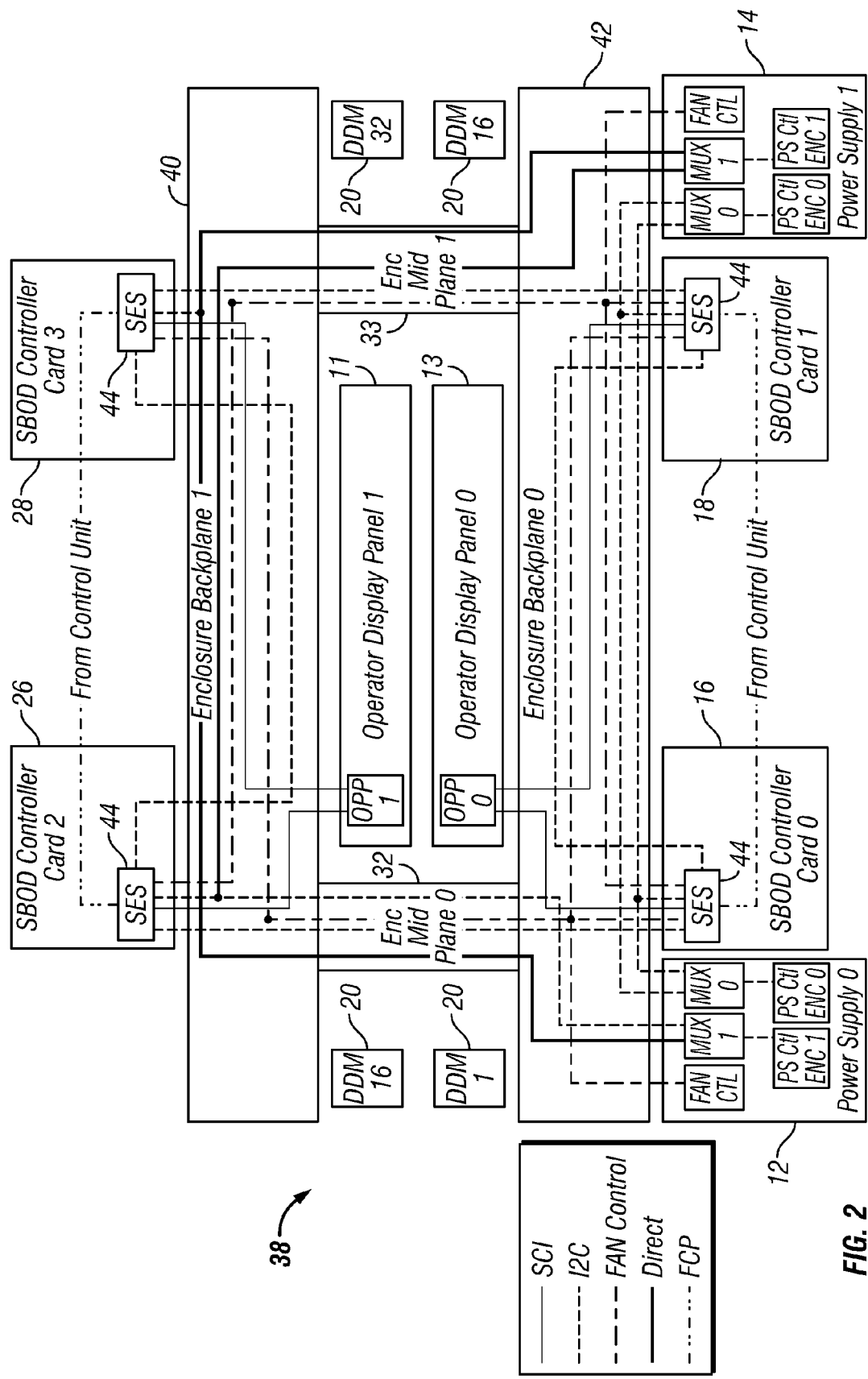
FIG. 2 illustrates an example enclosure management services communications network configuration.

FIG. 2 describes an enclosure management services communications network configuration 38. Configuration 38 includes the various subcomponentry described in FIG. 1, including power supplies 12, 14, operator display panels 11, 13, SBOD controller cards 16, 18, 26 and 28, several DDM devices 20, and midplanes 32, 33. FIG. 2 also shows enclosure backplanes 40, 42, and four SES processor 44 devices integrated into each respective SBOD controller card 16, 18, 26, and 28. In addition, several network protocols connecting the various subcomponentry are described, including scalable component interface (SCI), inter-integrated circuit (I2C), and the like.

FIG. 2 depicts a layout of resources such that the SES processors 44 of each FC-AL loop can access/address all enclosure resources for management purposes as shown. Each SES processor 44 monitors and manages both the enclosure 10 common resources and its local resources that only processor 44 can access and manage due to physical connectivity. The capability of each SES processor 44 to access the common enclosure resources and communication with the peer SES processors 44 allows for the creation of a logical SES entity comprised of a set of physical enclosure management resources for each FC-AL loop of a dual loop.

Figure 3:
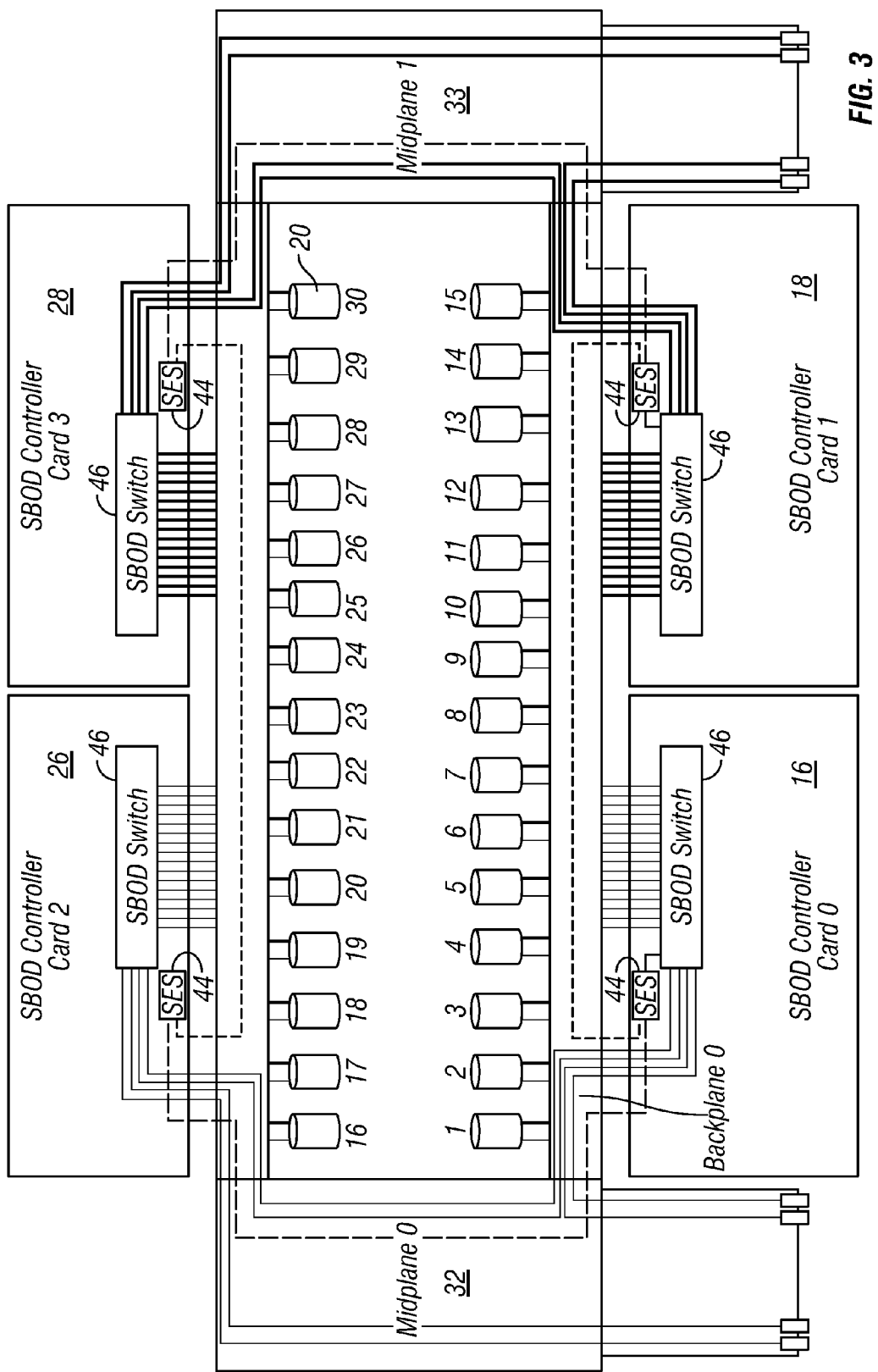
FIG. 3 describes example inter enclosure management services processor communications according to the present invention.

FIG. 3 describes inter-enclosure management services processor communications according to the present invention, and shows the configuration of the SES processors 44 (including SBOD switches 46) that are presented to the FC-AL storage device communications network [SBOD Controller Card 16-SES and SBOD Controller Card 18-SES] and the subordinate SES processors 44 that are not presented to the FC-AL storage network. In the depicted configuration, SBOD controller card 26 is subordinate to SBOD controller card 16 and SBOD controller card 28 is subordinate to SBOD controller card 18 The depicted leader SES processors 44 (integrated into cards 16, 18) manage the communications interface to the respective RAID controller via the communications network and manage the dispatch of tasks required between the leader and subordinate SES processors 44 of each FC-AL dual loop. This configuration of SES processors 44 interfacing to the FC-AL network minimizes the number of FC-AL addresses required on each FC-AL dual loop for each enclosure 10.

In this schema, the enclosure management services firmware that is running on the local SES processors 44 is used to hide the fact that there is a physical partitioning of the enclosure resources. Each SES processor 44 [whether leader or subordinate] will synchronize and merge the data from its virtual enclosure peer and create a single control image for the entire enclosure. A single SES instance is presented to the storage device interconnect network and to the host controller software.

FIGS. 4 and 5 describe the differences between how individual single virtual enclosures would each maintain a status page for their individual virtual enclosure resources [16 devices as shown in FIG. 4] and how the images are merged and combined such that the presentation of a single enclosure instance is provided by the enclosure status page for all of the resources [32 devices as depicted in FIG. 5].

When operating in this mode, the architecture and structure of the resources permits the enclosure management services to switch the identity of the leader and subordinate SES devices by changing which SES device is presented to the FC-AL network via the switch 46 ports. This would be helpful in the case where the SES FC-AL port of the FC-AL switching device 46 failed and the capability to communicate to the FC-AL fabric is lost through that port. The virtual enclosure peer can take over and reconfigure the FC-AL switches to place its SES port of the second FC-AL switch on the FC-AL network and pick up responsibility for the leader SES role.

Implementing and utilizing the example implementations of the present invention as described can provide a simple, effective method of providing for hierarchical enclosure management services, and serves to maximize the performance of the storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A configuration of an array of storage devices compliant with a fibre-channel arbitrated loop (FC-AL) specification, comprising:
a plurality of storage devices;
first and second controllers coupled to the plurality of storage devices, the first and second controllers including integrated first and second SCSI enclosure services (SES) processing devices acting as leader processors; and
third and fourth controllers coupled to the first and second controllers and to the plurality of storage devices, the third and fourth controller acting as subordinate processors and including integrated third and fourth SCSI enclosure services (SES) processing devices, wherein:
each of the SES processing devices synchronizes and merges data, including status data maintained by each of the SES processing devices into a single status page reflecting the resources of an enclosure, to create a single control image for the entire configuration, and presents a single SES instance to a storage device interconnect network and to host controller software.

2. The array of claim 1, further including a switch device connecting the first controller to the array of storage devices to distribute data to the storage devices.

3. The array of claim 1, wherein the first and third SES processing devices are connected via a midplane structure.

4. The array of claim 1, wherein physical partitioning of any of the SES processing devices is concealed using enclosure management services firmware running on each of the SES processing devices.

5. The array of claim 2, wherein, upon a failure of the switch device, the designation of leader and subordinate SES processing devices is changed to present a different SES instance to the storage device interconnect network.

6. The array of claim 5, wherein changing the designation of leader and subordinate SES processing devices is performed using enclosure management services firmware running on each of the SES processing devices.

7. A system for managing data within a fibre channel arbitrated loop (FC-AL) dual loop storage network, comprising:
a first controller card including a first small computer systems interface (SCSI) enclosure services (SES) processor module organized as a first leader processor;
a second controller card including a second SES processor module organized as a second leader processor;
a third controller card including a third SES processor module organized as a first subordinate processor; and
a fourth controller card including a fourth SES processor module organized as a second subordinate processor, the third and fourth controller cards electrically connected to the first and second controller cards, wherein:
the first SES processor and the third SES processor are configured to synchronize and merge data, including status data maintained by each of the first and third SES processors into a first status page reflecting the resources of a first enclosure, and presented within the storage network as a single logical entity on a first loop of the dual loops, and
the second SES processor and the fourth SES processor are configured to synchronize and merge data, including status data maintained by each of the second and fourth SES processors into a second status page reflecting the resources of a second enclosure, and presented within the storage network as a single logical entity on a second loop of the dual loops.

8. The system of claim 7, further including a switching device integrated into the first controller card for routing data throughout the storage network.

9. The system of claim 7, wherein the first and third SES processors are connected via a midplane structure.

10. The system of claim 7, wherein physical partitioning of any of the SES processors is concealed using enclosure management services firmware running on each of the SES processors.

11. The system of claim 8, wherein, upon a failure of the switching device, the designation of leader and subordinate SES processors is changed to present a different SES instance to the storage network.

12. The system of claim 11, wherein changing the designation of leader and subordinate SES processors is performed using enclosure management services firmware running on each of the SES processors.

13. A method of manufacturing an array of storage devices compliant with a fibre-channel arbitrated loop (FC-AL) specification, comprising:

providing a plurality of storage devices;

providing first and second controllers including integrated first and second SCSI enclosure services (SES) processing devices acting as leader processors;

coupling the first and second controller to the plurality of storage devices;

providing third and fourth controllers acting as subordinate processors, the third and fourth controllers including integrated third and fourth SES processing devices, respectively;

coupling the third and fourth controllers to the first controller, the second controller, and the plurality of storage devices, wherein:

each of the SES processing devices synchronizes and merges data, including status data maintained by each of the SES processing devices into a single status page reflecting the resources of an enclosure, to create a single control image for the entire configuration, presenting a single SES instance to a storage device interconnect network and to host controller software.

14. The method of manufacture of claim 13, further including providing a switch device connecting the first controller to the array of storage devices to distribute data to the storage devices.

15. The method of manufacture of claim 13, wherein the first and third SES processing devices are connected via a midplane structure.

16. The method of manufacture of claim 13, wherein physical partitioning of any of the SES processing devices is concealed using enclosure management services firmware running on each of the SES processing devices.

17. The method of manufacture of claim 14, wherein, upon a failure of the switch device, the designation of leader and subordinate SES processing devices is changed to present a different SES instance to the storage device interconnect network.

18. The method of manufacture of claim 17, wherein changing the designation of leader and subordinate SES processing devices is performed using enclosure management services firmware running on each of the SES processing devices.

* * * * *